(12) United States Patent
Lee et al.

(10) Patent No.: US 7,006,736 B2
(45) Date of Patent: Feb. 28, 2006

(54) PLANAR LIGHT WAVE CIRCUIT AND OPTICAL PERFORMANCE MONITORING MODULE USING THE SAME

(75) Inventors: Joo-Hoon Lee, Yongin-shi (KR); Dong-Su Kim, Anyang-shi (KR); Kyoung-Youm Kim, Anyang-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 10/730,151

(22) Filed: Dec. 8, 2003

(65) Prior Publication Data

US 2004/0247231 A1    Dec. 9, 2004

(30) Foreign Application Priority Data

Jun. 4, 2003    (KR) .................... 10-2003-0035962

(51) Int. Cl.
*G02B 6/26* (2006.01)
(52) U.S. Cl. ........................... 385/47; 385/27; 385/45
(58) Field of Classification Search ............ 385/42–47, 385/27; 398/33
See application file for complete search history.

(56) References Cited

U.S. PATENT DOCUMENTS

| | | | |
|---|---|---|---|
| 6,324,312 B1 * | 11/2001 | Liao et al. | 385/11 |
| 6,434,303 B1 * | 8/2002 | Temkin et al. | 385/43 |
| 2002/0067891 A1 * | 6/2002 | Andersen | 385/47 |

* cited by examiner

*Primary Examiner*—John D. Lee
*Assistant Examiner*—James D. Stein
(74) *Attorney, Agent, or Firm*—Cha & Reiter, L.L.C.

(57) ABSTRACT

A planar light wave circuit is disclosed, which comprises: a first waveguide for receiving optical signals from an outside; a second waveguide having a first end surface and a second end surface, so that lights outputted from the first waveguide are partially reflected by the first end surface and are partially incidented into the first end surface and then outputted through the second end surface; a third waveguide for receiving the light reflected by the first end surface; and a common region bordering each end surface of the first to the third waveguides and having an index of refraction different from an index of refraction of the second waveguide.

8 Claims, 4 Drawing Sheets

PLANAR LIGHT WAVE CIRCUIT AND OPTICAL PERFORMANCE MONITORING MODULE USING THE SAME

CLAIM OF PRIORITY

This application claims priority to an application entitled "Planar light wave circuit and optical performance monitoring module using the same," filed in the Korean Intellectual Property Office on Jun. 4, 2003 and assigned Serial No. 2003-35962, the contents of which are hereby incorporated by reference.

BACKGROUND OF THE INVENTION

1. Field of the Invention

The present invention relates to an optical communication system, particularly to an apparatus for monitoring an optical signal passing through the optical communication system.

2. Description of the Related Art

In an optical communication system with a wavelength division multiplexing (WDM) method, an optical signal passing through the optical fiber generally includes a plurality of channels with wavelengths different from each other. In order to monitor certain characteristics, such as the optical signal-to-noise ratio (OSNR), wavelength and power with respect to each channel, the optical communication system includes an optical performance monitor (OPM).

Although a conventional OPM can measure various characteristics of an inputted optical signal, it does not provide a means or method that is capable of measuring a polarization characteristic. When an optical signal has a bad polarization characteristic, a polarization mode dispersion (PMD) may develop thus becoming a big problem to light transmission. The polarization mode dispersion occurs due to the relation between a physical property of an optical fiber and a polarization state of an optical signal passing through the optical fiber. In the polarization mode dispersion, a birefringence that may occur due to the noncircular ratio of a core, an asymmetric index of refraction, and an asymmetric stress in an optical-fiber drawing process cause group velocities of polarization components passing along two polarization axes to have differences, which result in a differential group delay (DGD), thereby causing the pulse to be spread. Accordingly, a polarization characteristic plays a large role in determining the characteristics of an optical signal.

SUMMARY OF THE INVENTION

Accordingly, the present invention was developed to solve the above-mentioned problems associated with the prior art. One aspect of the present invention is to provide an optical-performance monitoring module, which can measure the polarization characteristic of an optical signal, so that the optical-performance monitoring module can be employed in an optical communication system.

Another aspect of the present invention is to provide a planar light wave circuit, which can be used for various other purposes in addition to measuring the polarization characteristic of an optical signal.

In one embodiment, a planar light wave circuit is provided and includes: a first waveguide for receiving external optical signals; a second waveguide having a first end surface and a second end surface, so that lights outputted from the first waveguide are partially reflected and partially incidented into the first end surface and then outputted through the second end surface; a third waveguide for receiving the light reflected by the first end surface; and a common region bordering each end surface of the first to the third waveguides and having an index of refraction different from an index of refraction of the second waveguide.

BRIEF DESCRIPTION OF THE DRAWINGS

The above and other aspects, features, and advantages of the present invention will become more apparent from the following detailed description taken in conjunction with the accompanying drawings, in which.

DETAILED DESCRIPTION OF THE PREFERRED EMBODIMENT

Figure 1:
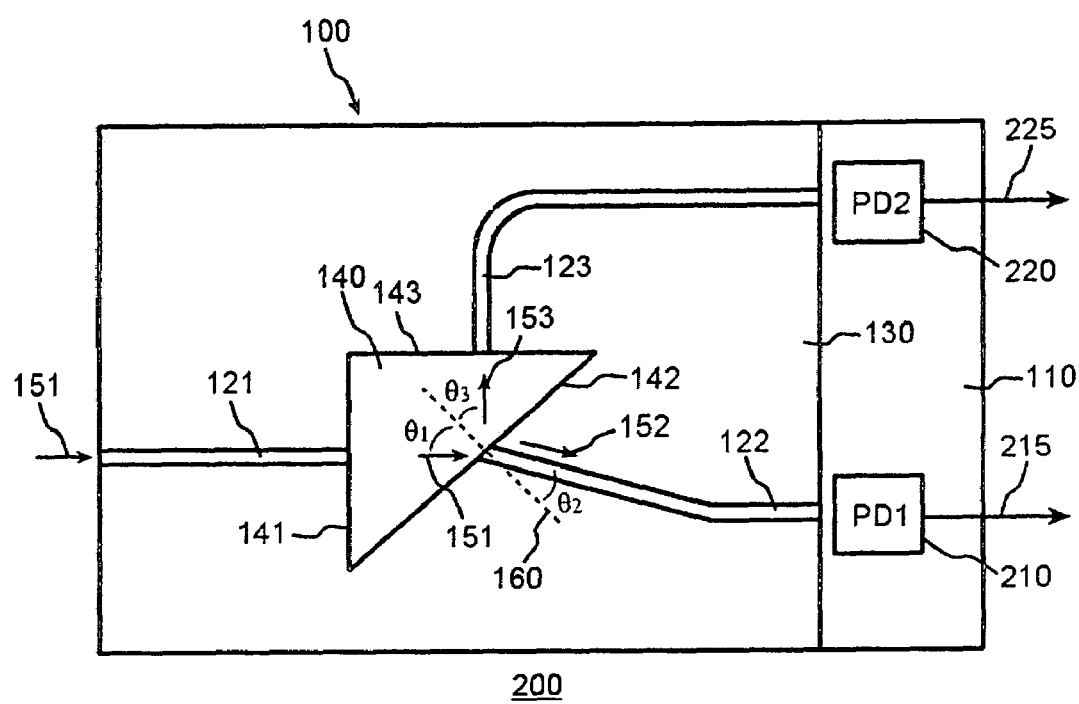
FIG. 1 is a block diagram showing a construction of an optical-performance-monitoring module according to a preferred embodiment of the present invention.
Figure 2:
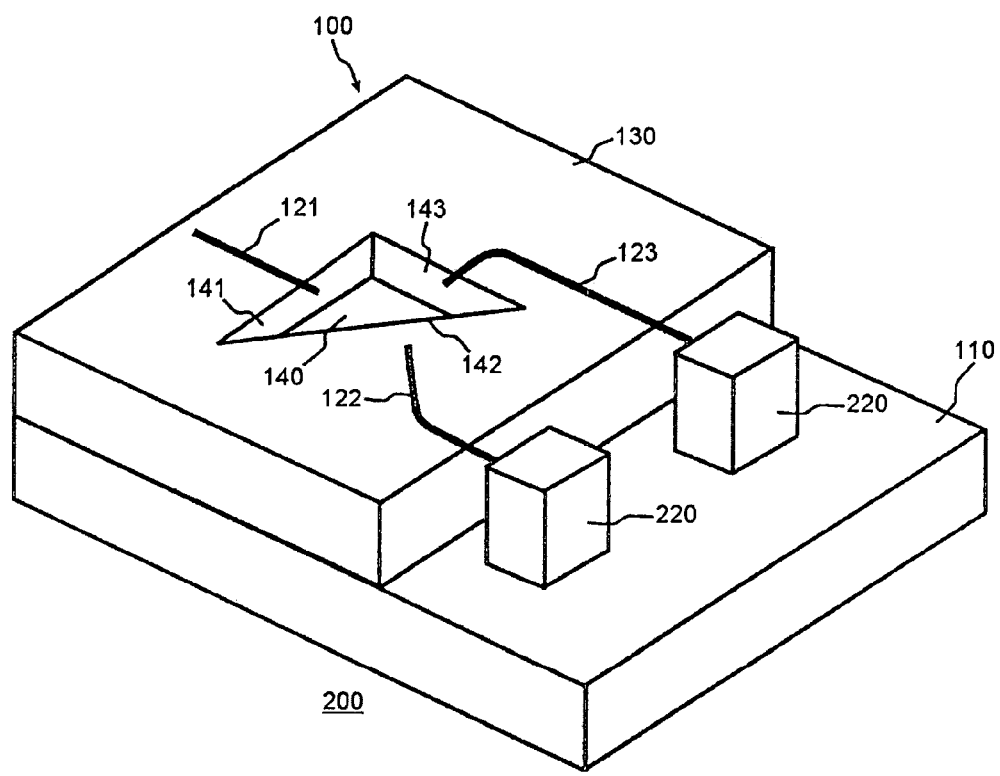
FIG. 2 is a top view of the optical-performance-monitoring module shown in FIG. 1.

A preferred embodiment of the present invention will be described with reference to the accompanying drawings. For the purpose of clarity and simplicity, a detailed description of known functions and configurations will be omitted herein. FIG. 1 is a block diagram showing a construction of an optical-performance-monitoring module according to a preferred embodiment of the present invention and FIG. 2 is a perspective view showing the optical-performance-monitoring module shown in FIG. 1.

The optical-performance-monitoring module 200 includes a planar light wave circuit 100 and first and second detectors 210 and 220.

The planar light wave circuit 100 is formed on a semiconductor substrate 110 and includes a first to a third waveguide 121 to 123 with a relatively high index of refraction and a clad 130 surrounding the first to the third waveguide 121 to 123. In order to minimize optical coupling loss occurring when an optical signal is inputted to the first to the third waveguide 121 to 123, they may selectively have an index of refraction different from each other.

A common region 140, which has an index of refraction different from that of the first to the third waveguide 121 to 123, is formed in a central portion of the planar light wave circuit 100. The common region 140 is provided by forming a hole, which is shaped like a triangular column extending up to the surface of the substrate 110, in the central portion of the planar light wave circuit 100.

Each of the first to the third waveguides 121 to 123 is exposed on corresponding side surfaces 141 to 143 of the common region 140. When the planar light wave circuit 100 includes other waveguides in addition to the first to the third waveguide 121 to 123, the common region 140 may have the shape of a polygonal column in addition to the triangular column. In this case, as the added waveguide, similar to waveguide 121, is used as a waveguide for receiving an optical signal from the outside, the optical-performance-monitoring module 200 may selectively receive its input from among a number of optical signals with different wavelengths. This advantage of course may be obtained because the common region 140 has the shape of a triangular column and waveguides are added to a position adjacent to the first waveguide 121. Since the common region 140 is an empty space filled with air, the index of refraction of the common region 140 is one (1). However, materials with a different index of refraction may be filled into the common region 140.

The first waveguide 121 receives optical signals 151 with a predetermined wavelength from the outside through a first end surface and outputs the optical signals 151 to the common region 140 through a second end surface. Incident to the first end surface of the second waveguide 122 beyond the common region 140 is a portion of the outputted optical signals 151. Hence, a portion of the optical signals 151 is reflected and the other portion of the optical signals 151 is transmitted. The transmitted lights 152 are outputted through a second end surface of the second waveguide 122.

A portion of the lights 153, reflected by the first end surface of the second waveguide 122, is directed into the first end surface of the third waveguide 123 beyond the common region 140 and outputted through a second end surface.

As expressed in equation 1, an incidence angle of the optical signal 151 is equal to an angle of reflection of the optical signal 151 with respect to a normal line 160 of the first end surface of the second waveguide 122, and a relation between the incidence angle of the optical signal 151 and the angle of reflection of the optical signal 151 follows Snell's law.

$$n_1 \sin \theta_1 = n_2 \sin \theta_2, \theta_3 = \theta_1, \qquad \text{Equation 1}$$

wherein, $n_1$ represents the index of refraction of the common region 140, $\theta_1$ represents the incidence angle of the optical signal 151, $n_2$ represents the index of refraction of the second waveguide 122, $\theta_2$ represents the refraction angle of the optical signal 151 and $\theta_3$ represents the angle of reflection of the optical signal 151. When the index of refraction of the common region 140 and the second waveguide 122 and the incidence angle of the optical signal 151 are known, a refraction angle may be obtained from equation 1.

The transmitted light 152 and the reflected light 153 include TE and TM polarization components, respectively. When the incidence angle of the optical signal 151 is a Brewster angle, the reflected light 153 includes only the TE polarization component. In this case, the planar light wave circuit 100 can function as a planar polarization filter for filtering the TE polarization component. In the transmitted light 152 or the reflected light 153, each power of the TE and TM polarization components can be obtained by means of Fresnel coefficients.

$$r_x = \frac{n_1 \cos \theta_1 - n_2 \cos \theta_2}{n_1 \cos \theta_1 + n_2 \cos \theta_2}, t_x = 1 + r_x \qquad \text{Equation 2}$$

$$r_y = \frac{n_2 \cos \theta_1 - n_1 \cos \theta_2}{n_2 \cos \theta_1 + n_1 \cos \theta_2}, t_y = \frac{n_1}{n_2}(1 + r_y),$$

wherein, $r_x$ represents Fresnel reflection coefficient of the TE polarization component, $t_x$ represents Fresnel transmission coefficient of the TE polarization component, $r_y$ represents Fresnel reflection coefficient of the TM polarization component and $t_y$ represents Fresnel transmission coefficient of the TM polarization component. That is, a refraction angle is obtained by inserting a given index of refraction of the common region 140 and the second waveguide 122 and the incidence angle of the optical signal 151 into equation 1, and the Fresnel coefficients are obtained by inserting given values and the obtained refraction angle into equation 2.

The first detector 210 is formed on the substrate 110 so as to face a second end of the second waveguide 122 and detects the transmitted light 152 outputted from the second waveguide 122.

The second detector 220 is formed on the substrate 110 so as to face a second end of the third waveguide 123, it detects the reflected light 153 outputted from the third waveguide 123.

A photodiode may be used as the first detector 210 facing the second waveguide 122. As expressed in equation 3, the power of the transmitted light 152 detected by the first detector 210 is substantially the same as the sum of powers of the TE and TM polarization components and the power of the reflected light 153 detected by the second detector 220 is substantially the same as the sum of powers of the TE and TM polarization components.

$$PD_1 = P_x' + P_y'$$

$$PD_2 = P_x'' + P_y'' \qquad \text{Equation 3}$$

wherein, $PD_1$ represents the power of the transmitted light 152, $P_x'$ represents the power of the TE polarization component from among the transmitted light 152, $P_y''$ represents the power of the TM polarization component from among the transmitted light 152, $PD_2$ represents the power of the reflected light 153, $P_x''$ represents the power of the TE polarization component from among the reflected light 153, $P_y''$ represents the power of the TM polarization component from among the reflected light 153. Further, each power of the TE and TM polarization components of the transmitted light 152 and reflected light 153 can be obtained by means of the following equation.

$$P_x' = (1 - |r_x|^2) P_x, \; P_y' = (1 - |r_y|^2) P_y, \; P_x| = |r_x|^2 P_x, \; P_y| = |r_y|^2 P_y \qquad \text{Equation 4}$$

wherein, $P_x$ represents the power of the TE polarization component from among the optical signal 151 and $P_y$ represents the power of the TM polarization component from among the optical signal 151. Accordingly, a quadratic simultaneous equation employing $P_x$ and $P_y$ as variables is induced by inserting measured powers of the transmitted light 152 and the reflected light 153 and the obtained Fresnel reflection coefficients into equation 3. Further, powers of the TE and TM polarization components of the optical signal 151 can be obtained by solving the quadratic simultaneous equation.

Figure 3:
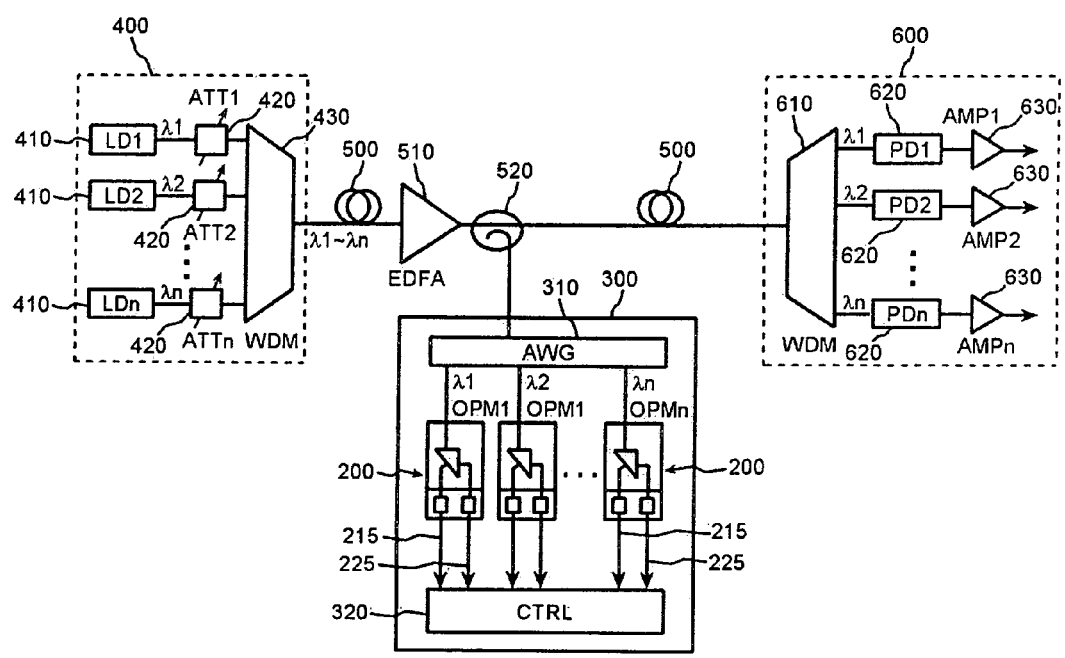
FIG. 3 is a block diagram showing a construction of an optical communication system including the optical-performance-monitoring module shown in FIG. 1; and, FIG. 4 is a graph showing an output spectrum of an arrayed waveguide grating shown in FIG. 3.
Figure 4:
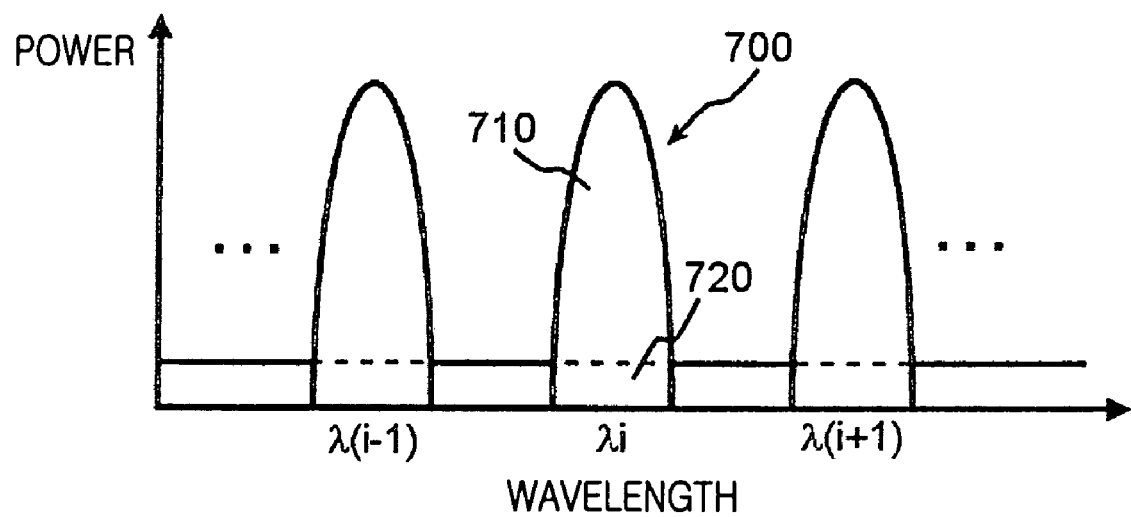

FIG. 3 is a block diagram showing the construction of an optical communication system including the optical-performance-monitoring module shown in FIG. 1 and FIG. 4 is an output spectrum plot of the arrayed waveguide grating shown in FIG. 3.

The system includes an optical transmission section 400, an optical amplification section 510, a power splitter 520, an optical-performance-monitoring apparatus 300 and an optical reception section 600. The interconnection of the components is by means of an optical fiber 500.

The optical transmission section 400 includes a first to a nth laser diode 410, a first to a nth optical attenuator 420 and a wavelength division multiplexer 430. Each of the first to the nth laser diodes 410 outputs a channel with a predetermined wavelength. The first to the nth optical attenuators 420 are connected to the first to the nth laser diodes 410 in a one-to-one fashion and respectively attenuates the power of the inputted channel by adjusting the optical signal-to-noise ratio.

The wavelength division multiplexer 430 is connected to the first to the nth optical attenuator 420, multiplexes the first to the nth inputted channel $\lambda_1$ to $\lambda_n$ and transmits the multiplexed optical signal through the optical fiber 500. The first to the nth channel $\lambda_1$ to $\lambda_n$ are spaced apart by predetermined wavelength intervals.

The optical amplification section 510 is located along the optical fiber 500, which connects the optical transmission section 400 to the optical reception section 600, and amplifies the inputted optical signal. An erbium-doped fiber amplifier (EDFA) may be used as the optical amplification section 510. The erbium-doped-fiber amplifier includes an erbium-doped optical fiber for amplifying the inputted optical signal through a population inversion and a pump source for pumping the erbium-doped optical fiber.

The optical reception section 600 includes a wavelength division multiplexer 610, a first to a nth photodiode 620, and a first to a nth amplifier 630. The wavelength division multiplexer 610 is connected to the optical fiber 500, wavelength division demultiplexes the inputted optical signal and outputs demultiplexed channels. Each of the first to the nth photodiodes 620 converts the inputted channel into an electrical signal. The first to the nth amplifier 630 are connected to the first to the nth photodiode 620 in a one-to-one fashion, and amplifies inputted electrical signals, respectively.

The power splitter 520 divides a portion of optical signals outputted from the optical amplification section 510 and outputs the divided optical signals to the optical-performance-monitoring apparatus 300 and the optical reception section.

The optical-performance-monitoring apparatus 300 includes an arrayed waveguide grating (AWG) 310, a first to the nth optical-performance-monitoring module 200 and a control section 320. The arrayed waveguide grating 310 demultiplexes the divided optical signals and outputs the first to the nth demultiplexed channel $\lambda_1$ to $\lambda_n$. The first to the nth optical-performance-monitoring module 200 is connected to the arrayed waveguide grating 310, converts the inputted channel into the first and second electrical signals 215 and 225, respectively, and outputs the converted electrical signals.

The control section 320 obtains powers of the TE and TM polarization components in a corresponding channel from powers of the first and the second electrical signals 215 and 225 with respect to each channel.

As shown in FIG. 4, each power 700 of the first to the nth channels $\lambda_1$ to $\lambda_n$ outputted from the arrayed waveguide grating 310 includes a signal component 710 and a noise component 720. Most of the noise component 720 comprises an amplified spontaneous emission (ASE) outputted from the optical amplification section 510.

The optical-performance-monitoring apparatus 300 can measure an optical signal-to-noise ratio in addition to measuring a polarization characteristic of an inputted optical signal and the detailed measurement method can be diversely realized. For instance, an inputted optical signal includes a first to a nth channel $\lambda_1$ to $\lambda_n$ and the arrayed waveguide grating 310 can output a first to a (nth+1) channel. Hence, the (nth+1) channel can be regarded as a preliminary channel, not being used as a channel for a signal, and consists of only the noise component containing the amplified spontaneous emission outputted from the optical amplification section 510. An optical signal-to-noise ratio with respect to the first channel $\lambda_1$ is $P_{n+1}/(P_{n+1}-P_1)$, wherein, $P_1$ represents a power of the first channel and $P_{n+1}$ represents a power of the n+1 channel. Therefore, a power of each channel is substantially the same as the sum of powers of the first and the second electrical signals 215 and 225 outputted from the optical-performance-monitoring module 200.

The optical-performancemonitoring apparatus 300 has predetermined channel power information and can obtain an optical signal-to-noise ratio with respect to a corresponding channel by comparing the information with measured channel power information. Further, the optical-performance-monitoring apparatus 300 examines (compares output powers with a reference power) output powers of the first to the nth optical-performance-monitoring module 200, thereby determining the wavelengths of the channels, which an inputted optical signal includes.

As described above, the optical-performance-monitoring module according to the present invention can measure an optical signal-to-noise ratio with respect to an optical signal, a wavelength, a power and polarization characteristic, etc., by means of a planar light wave circuit with a common region having been formed in a central portion of the planar light wave circuit.

Further, the planar light wave circuit according to the present invention can be used as a planar polarization filter in addition to measuring a polarization characteristic of an optical signal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A planar light wave circuit comprising:
   a common region defined by each bordering end surface of a first to a third waveguides;
   the first waveguide for receiving external optical signals to be guided to the common region;
   the second waveguide having the end surface bordering the common region, so that lights outputted from the first waveguide are partially reflected by and partially incidented into the end surface of the second waveguide and then outputted through the second waveguide; and
   the third waveguide for receiving light reflected by the end surface of the second waveguide and outputting said light,
   wherein the common region is an opening formed on the planar light wave circuit.

2. The planar light wave circuit as set forth in claim 1, wherein the the opening has a polygonal column shape in a central portion of the planar light wave circuit, and each of the end surfaces of the first to the third waveguides is located and exposed on a side surface of the opening.

3. An optical performance monitoring module comprising:
   a planar light wave circuit including a first waveguide for receiving an optical signal, a second waveguide, a third waveguide for receiving the light reflected by an end surface of the second waveguide, and a common region;
   the second waveguide having the end surface, so that lights outputted from the first waveguide are partially reflected by the end surface and are partially incidented into the end surface and then outputted through the second waveguide;

the common region bordering each end surface of the first to the third waveguides and having an index of refraction different from an index of refraction of the second waveguide;

a first detector for detecting transmitted light outputted from the second waveguide; and a second detector for detecting reflected light outputted from the third waveguide, wherein powers of a TE and a TM polarization of the optical signal are obtained from index of refractions of the first to the third waveguides, an index of refraction of the common region, and Fresnel coefficients of a TE and a TM polarization obtained from an incidence angle and angle of reflection of the optical signal based on a normal line of the end surface of the second waveguide.

4. The optical performance monitoring module as claimed in claim 3, wherein the powers of the TE and the TM polarization of the optical signal are obtained by means of the following equation, $$PD_1 = P'_x + P'_y$$

$$PD_2 = P''_x + P''_y$$

$$r_x = \frac{n_1 \cos \theta_1 - n_2 \cos \theta_2}{n_1 \cos \theta_1 + n_2 \cos \theta_2}, t_x = 1 + r_x$$

$$r_y = \frac{n_2 \cos \theta_1 - n_1 \cos \theta_2}{n_2 \cos \theta_1 + n_1 \cos \theta_2}, t_y = \frac{n_1}{n_2}(1 + r_y),$$

$$n_1 \sin \theta_1 = n_2 \sin \theta_2, \theta_3 = \theta_1$$

$$P'_x = (1 - |r_x|^2)P_x, P'_y = (1 - |r_y|^2)P_y$$

$$P''_x = |r_x|^2 P_x, P''_y = |r_y|^2 P_y$$

wherein, $PD_1$ represents a power of the transmitted light, $P_x'$ represents a power of TE polarization component from among the transmitted light, $P_y'$ represents a power of TM polarization component from among the transmitted light, $PD_2$ represents a power of the reflected light, $P_x''$ represents a power of TE polarization component from among the reflected light, $P_y''$ represents a power of TM polarization component from among the reflected light, $P_x$ represents a power of TE polarization component from among an optical signal, $P_y$ represents a power of TM polarization component from among an optical signal, $r_x$ represents Fresnel reflection coefficient of the TE polarization component, $n_1$ represents an index of refraction of the common region, $\theta_1$ represents an incidence angle of an optical signal, $n_2$ represents an index of refraction of the second waveguide, $\theta_2$ represents a refraction angle of the transmitted light, $t_x$ represents Fresnel transmission coefficient of the TE polarization component, $r_y$ represents Fresnel reflection coefficient of the TM polarization component and $t_y$ represents Fresnel transmission coefficient of the TM polarization component.

5. The optical performance monitoring module as set forth in claim 3, wherein the second and third waveguides are constructed to satisfy predetermined transit times.

6. The optical performance monitoring module as set forth in claim 3, wherein the optical signal is incidented into the end surface of the second waveguide at a Brewster angle and the reflected light includes only the TE polarization component.

7. The optical performance monitoring module as claimed in claim 3, wherein the common region has a hole, which is shaped like a polygonal column and formed on the planar light wave circuit, and each of the end surfaces of the first to the third waveguides is located and exposed on a side surface of the hole.

8. The optical performance monitoring module as claimed in claim 7, wherein the hole has a shape of triangular column.

* * * * *